United States Patent
Ohba et al.

(10) Patent No.: US 8,942,641 B2
(45) Date of Patent: *Jan. 27, 2015

(54) ANTENNA APPARATUS AND COMMUNICATION APPARATUS

(71) Applicant: Kabushiki Kaisha Toshiba, Tokyo (JP)

(72) Inventors: Isao Ohba, Hachioji (JP); Hiroyuki Hotta, Hamura (JP); Koichi Sato, Tachikawa (JP); Masao Teshima, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,254

(22) Filed: Feb. 3, 2014

(65) Prior Publication Data

US 2014/0220906 A1   Aug. 7, 2014

Related U.S. Application Data

(63) Continuation of application No. 13/082,246, filed on Apr. 7, 2011, now Pat. No. 8,699,964, which is a continuation of application No. PCT/JP2009/064994, filed on Aug. 27, 2009.

(51) Int. Cl.
*H04B 1/40*       (2006.01)
*H04M 1/00*       (2006.01)
(Continued)

(52) U.S. Cl.
CPC ............. *H01Q 9/0442* (2013.01); *H01Q 1/243* (2013.01); *H01Q 5/0031* (2013.01); *H01Q 9/145* (2013.01); *H01Q 9/42* (2013.01); *H04B 1/40* (2013.01)
USPC ........ 455/77; 455/550.1; 455/575.7; 343/803; 343/881

(58) Field of Classification Search
CPC ........ H04B 1/16; H04B 1/40; H04B 2001/16; H04B 1/0028; H04B 1/163; H01Q 9/42; H03J 2200/06

USPC .............. 455/425, 73, 77, 83, 550.1, 562.1, 455/575.7; 343/803, 871, 881, 915
See application file for complete search history.

(56) References Cited

U.S. PATENT DOCUMENTS 5,789,995 A   8/1998   Minasi
6,246,866 B1  6/2001   Phang et al.
(Continued)

FOREIGN PATENT DOCUMENTS

JP   09301344   11/1997
JP   1079622    3/1998
(Continued)

OTHER PUBLICATIONS

Japanese Patent Application No. 2011-187569, First Office Action, mailed Jul. 31, 2012, (with English Translation).
(Continued)

*Primary Examiner* — Andrew Wendell
(74) *Attorney, Agent, or Firm* — Blakely, Sokoloff, Taylor & Zafman LLP

(57) ABSTRACT

According to one embodiment, an antenna apparatus comprises an antenna element connected to a feeding point, a grounded first lumped constant element connected to the antenna element, and a grounded second and third lumped constant elements connected to the antenna element through a selector. The selector is configured to connect the grounded second lumped constant element to the antenna element in order to lower a resonant frequency of the antenna element, and to connect the grounded third lumped constant element to the antenna element in order to raise the resonant frequency of the antenna element.

23 Claims, 18 Drawing Sheets

(51) Int. Cl.
*H01Q 9/26* (2006.01)
*H01Q 1/08* (2006.01)
*H01Q 9/04* (2006.01)
*H01Q 1/24* (2006.01)
*H01Q 5/00* (2006.01)
*H01Q 9/14* (2006.01)
*H01Q 9/42* (2006.01)

(56) References Cited

U.S. PATENT DOCUMENTS

| | | | |
|---|---|---|---|
| 6,378,603 B1 | 4/2002 | Shimoya et al. | |
| 6,738,603 B1 * | 5/2004 | Saito | 455/90.1 |
| 7,026,999 B2 | 4/2006 | Umehara et al. | |
| 7,136,022 B2 | 11/2006 | Sato et al. | |
| 7,215,283 B2 * | 5/2007 | Boyle | 343/700 MS |
| 7,345,637 B2 | 3/2008 | Mizoguchi et al. | |
| 7,825,859 B2 | 11/2010 | Teshima | |
| 7,825,861 B2 | 11/2010 | Sato et al. | |
| 7,885,614 B2 | 2/2011 | Jedeloo | |
| 8,614,647 B2 * | 12/2013 | Hotta et al. | 343/722 |
| 8,699,964 B2 * | 4/2014 | Ohba et al. | 455/77 |
| 2001/0054979 A1 | 12/2001 | Bahr et al. | |
| 2005/0094530 A1 | 5/2005 | Nakagawa et al. | |
| 2005/0153756 A1 | 7/2005 | Sato et al. | |
| 2007/0018758 A1 | 1/2007 | Fukuda et al. | |
| 2007/0057797 A1 | 3/2007 | Waldner et al. | |
| 2007/0187804 A1 | 8/2007 | El Rai et al. | |
| 2008/0169981 A1 | 7/2008 | Hotta et al. | |
| 2009/0115388 A1 | 5/2009 | Miyazaki et al. | |
| 2009/0231213 A1 | 9/2009 | Ishimiya | |
| 2010/0026596 A1 | 2/2010 | Nishio et al. | |
| 2010/0194658 A1 | 8/2010 | Yukimoto et al. | |
| 2010/0214181 A1 | 8/2010 | Ryou et al. | |
| 2011/0183633 A1 | 7/2011 | Ohba et al. | |

FOREIGN PATENT DOCUMENTS

| | | |
|---|---|---|
| JP | 2004201278 | 7/2004 |
| JP | 2005203878 | 7/2005 |
| JP | 2005295493 | 10/2005 |
| JP | 2006101486 | 4/2006 |
| JP | 2006166994 | 6/2006 |
| JP | 2006196994 | 7/2006 |
| JP | 2006279530 | 10/2006 |
| JP | 2007123982 | 5/2007 |
| JP | 2007142895 | 6/2007 |
| JP | 200828734 | 2/2008 |
| JP | 2008177668 | 7/2008 |
| JP | 2008199688 | 8/2008 |
| JP | 2008271468 | 11/2008 |
| JP | 201041071 | 2/2010 |
| JP | 2010526471 | 7/2010 |
| JP | 2011519542 | 7/2011 |
| WO | 2008013021 | 1/2008 |

OTHER PUBLICATIONS

PCT Notification of Transmittal of Translation of the International Preliminary Report of Patentability, Written Opinion of the International Searching Authority, Date of mailing Mar. 22, 2012, Applicants Reference No. 09S0467P, International Application No. PCT/JP2009/064994.

Japanese Patent Application No. 2010-549969, First Office Action, mailed Jan. 29, 2013, (with English Translation).

Japanese Written Opinion and Search Report from PCT/JP2009/064994 dated Aug. 27, 2009.

U.S. Appl. No. 13/082,246, Non Final Office Action, mailed Oct. 17, 2012.

U.S. Appl. No. 13/082,246, Final Office Action, mailed Mar. 14, 2013.

U.S. Appl. No. 13/082,246, Notice Of Allowance, mailed Nov. 29, 2013.

* cited by examiner

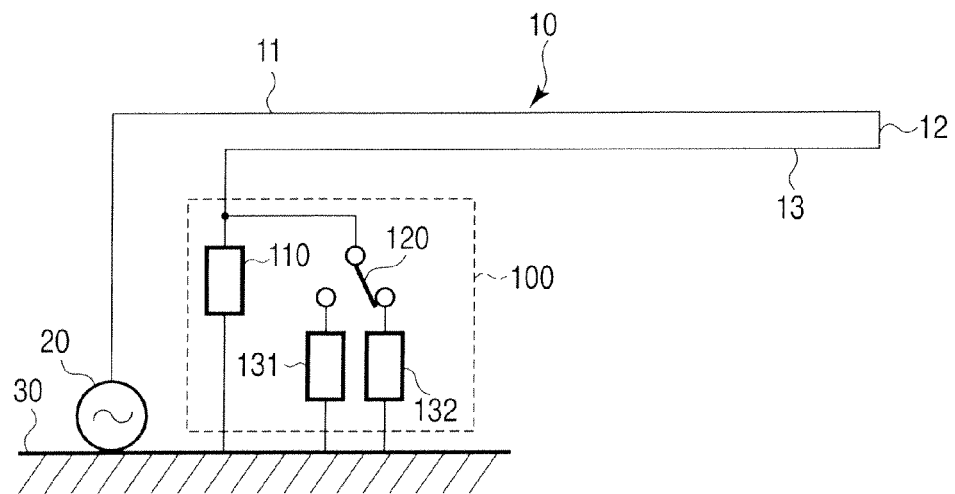
F I G. 1
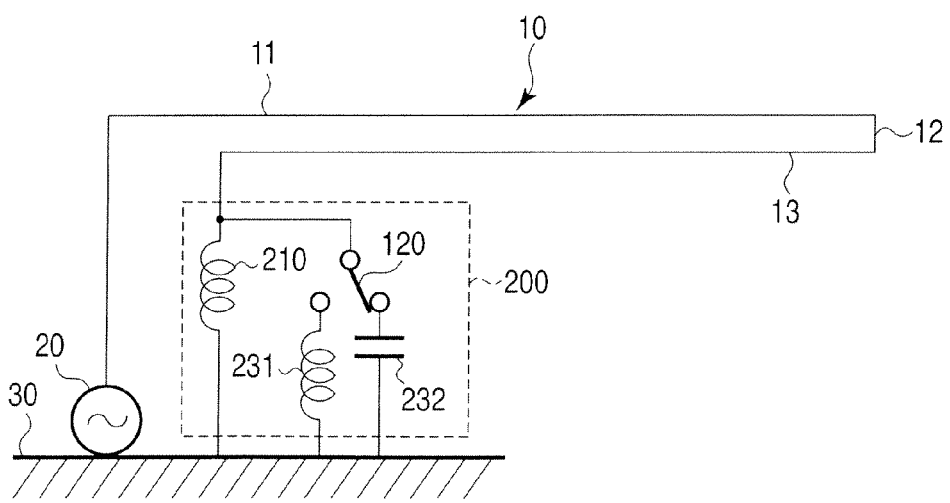
F I G. 2

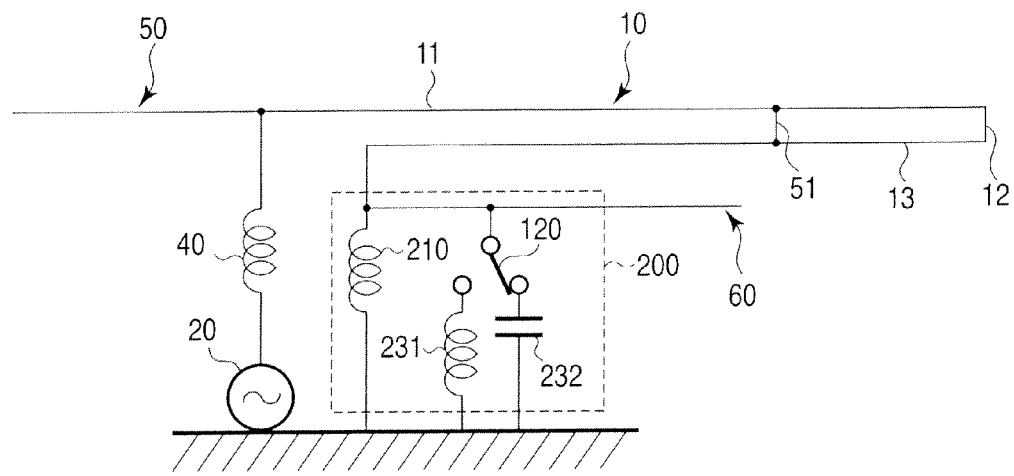
F I G. 5
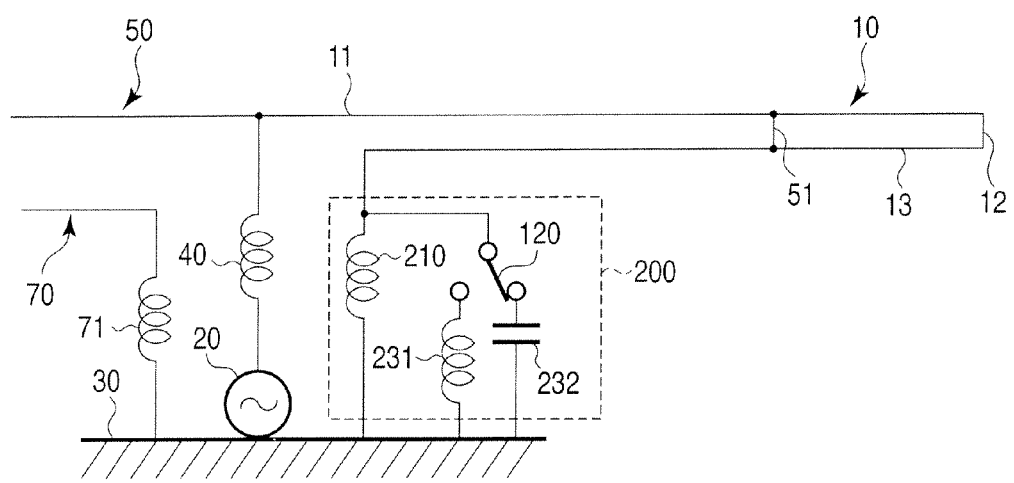
F I G. 6

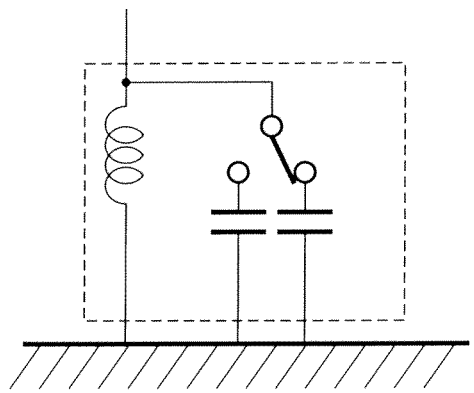
F I G. 12A
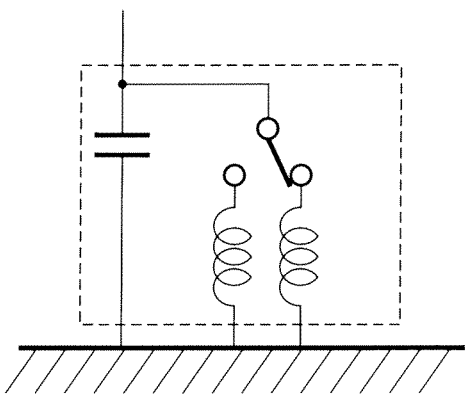
F I G. 12B

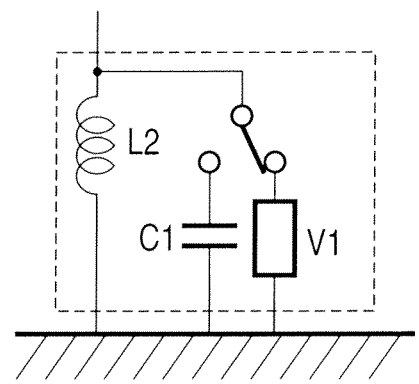
F I G. 15

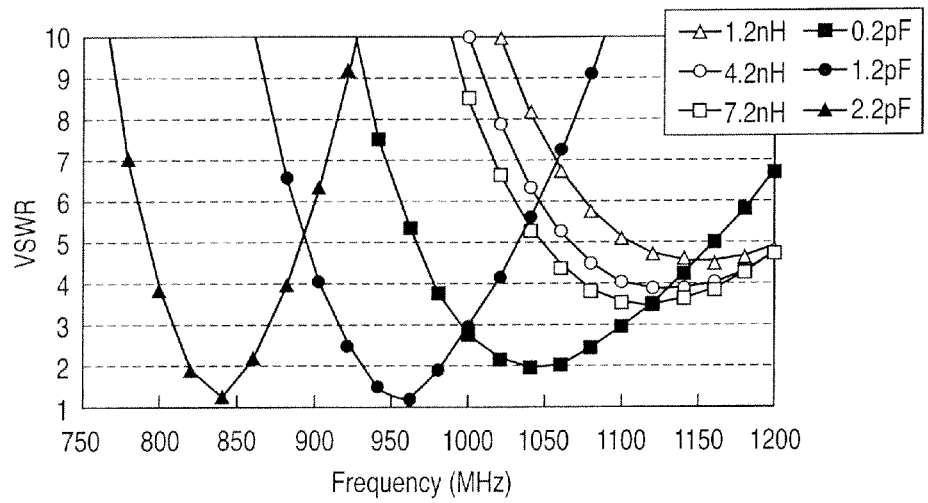
F I G. 16A
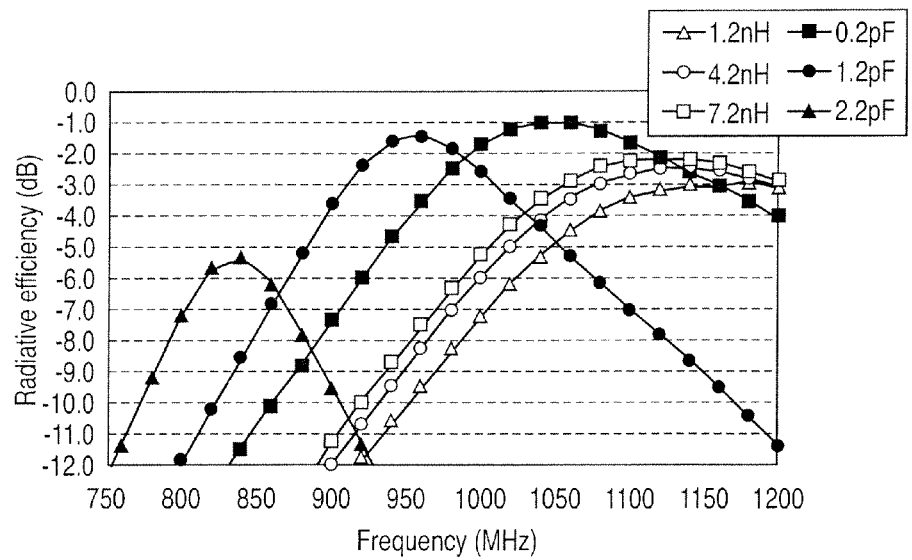
F I G. 16B

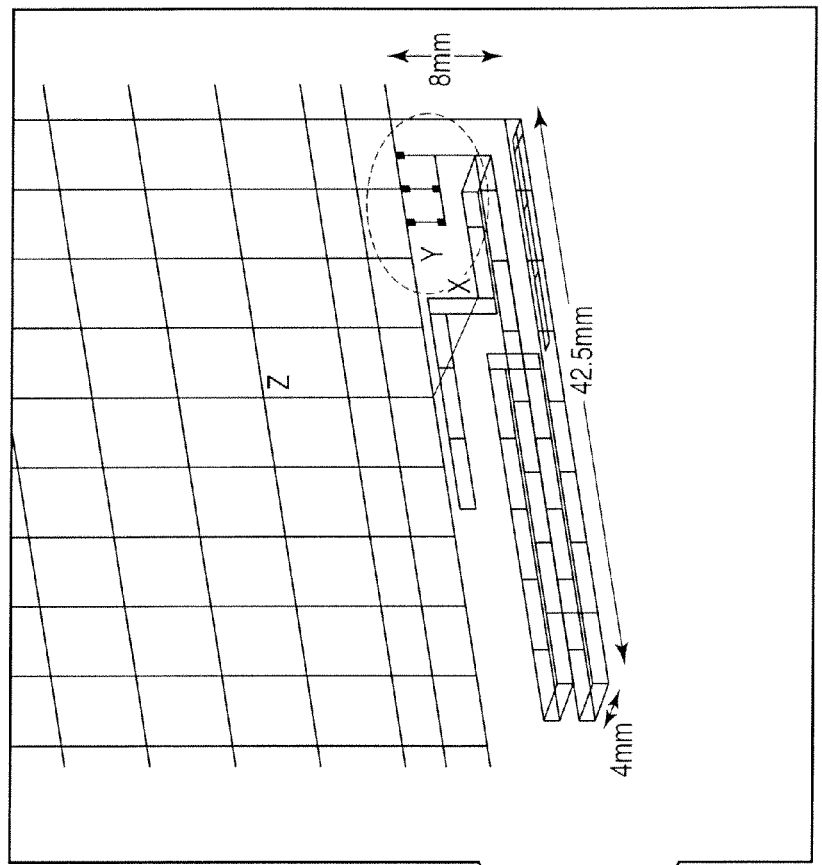
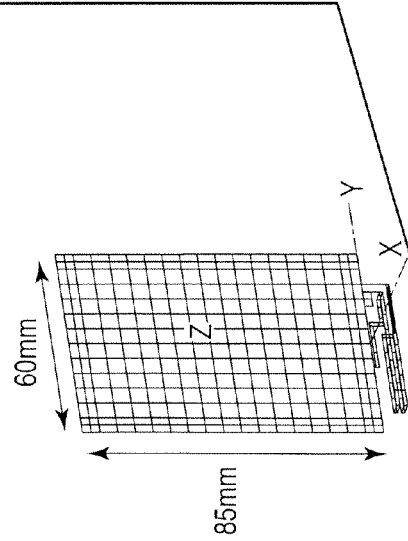
F I G. 18

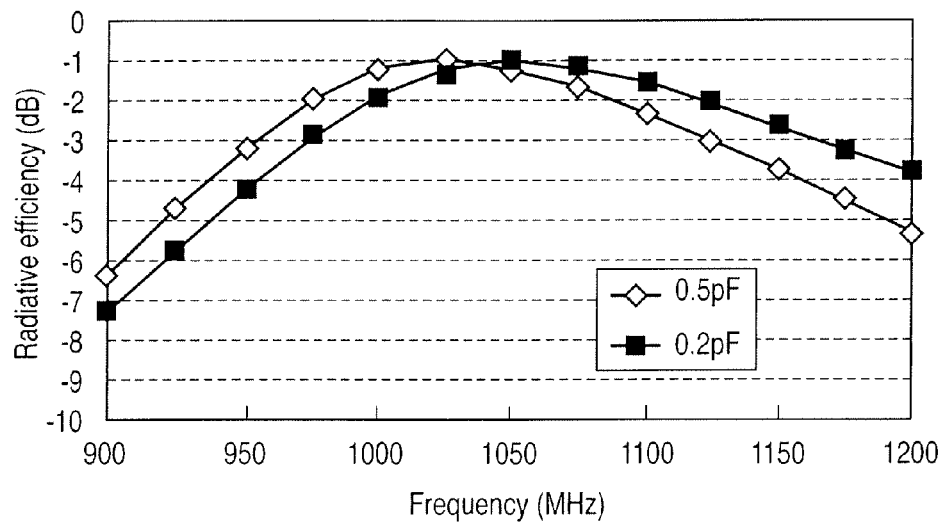
F I G. 20A
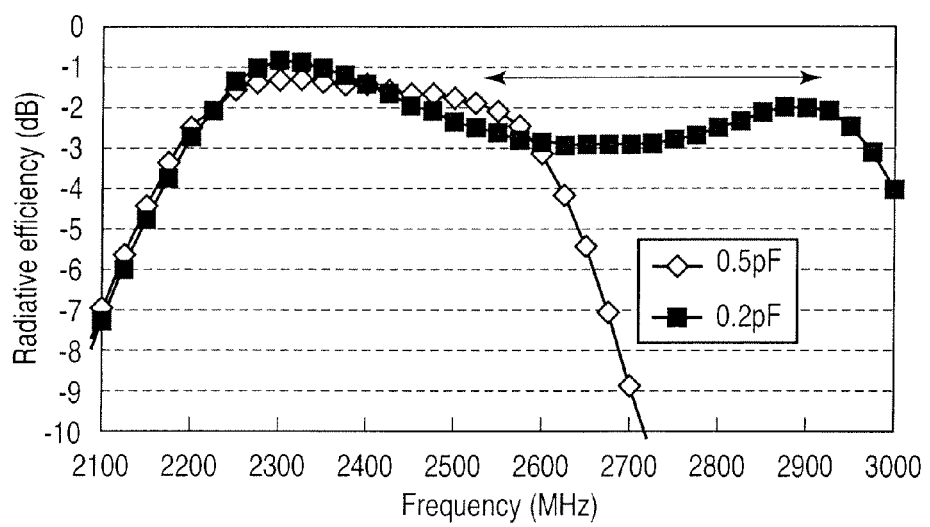
F I G. 20B

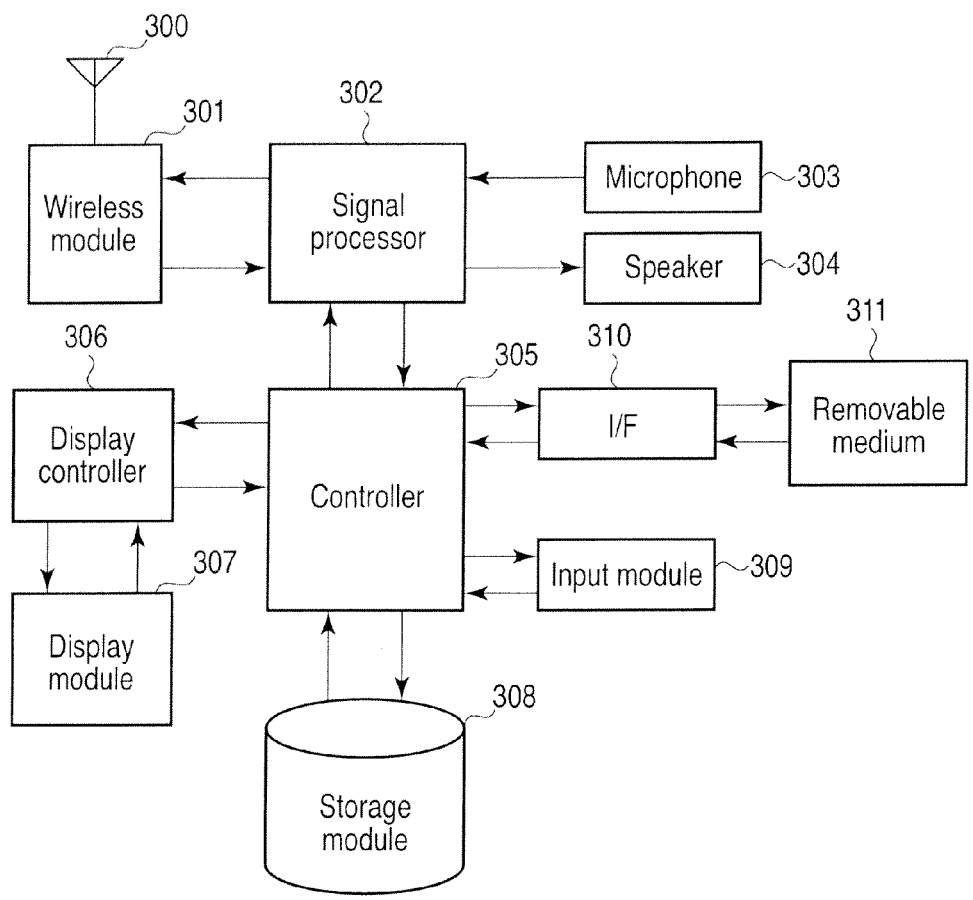
F I G. 21

ANTENNA APPARATUS AND COMMUNICATION APPARATUS

CROSS-REFERENCE TO RELATED APPLICATIONS

This is a Continuation application that is based upon and claims the benefit of priority from U.S. application Ser. No. 13/082,246, which is a Continuation application of PCT application No. PCT/JP2009/064994, filed Aug. 27, 2009, the entire contents of both of which are incorporated herein by reference.

FIELD

Embodiments described herein relate generally to a frequency-tunable technique.

BACKGROUND

Any antenna to be implemented with mobile terminals (e.g., mobile telephones) or on PCs should be small. The antenna should also support a broadband in order to cope with a plurality of wireless communication systems.

The antenna apparatus described in Jpn. Pat. Appln. KOKAI Publication No. 2005-203878 has a multi-resonant antenna that supports a plurality of wireless communication systems. More specifically, this antenna apparatus has an additional antenna element that shares a feeding point, with a folded monopole antenna, thus forming a multi-resonant antenna.

In the antenna apparatus described in Jpn. Pat. Appln. KOKAI Publication No. 2006-279530, an impedance adjusting module adjusts the operating frequency of the antenna apparatus. More precisely, the impedance at the open end of the antenna element is adjusted, thereby adjusting the operating frequency, in this antenna apparatus. The antenna apparatus supports a broadband because of the adjustment of operating frequency.

If the antenna apparatus described in Jpn. Pat. Appln. KOKAI Publication No. 2005-203878 is made smaller, the band each element of the multi-resonant antenna supports will decrease, ultimately making it difficult to ensure a part of the band. With regard to the frequency-tunable antenna (i.e., reconfigurable antenna), a configuration is known, which uses an active element, such as a switch, to switch the element connected to the antenna apparatus, from one to another, as in the antenna apparatus described in Jpn. Pat. Appln. KOKAI Publication No. 2006-279530, thereby adjusting the operating frequency of the antenna. However, the loss at the active element adversely influences the antenna radiative efficiency. This influence is more prominent as the antenna apparatus is miniaturized, reducing the radiative resistance of the antenna elements. Further, if the antenna apparatus is implemented by a multi-resonant antenna and if the frequency-tunable technique is applied to the antenna apparatus, resonant frequency that needs to be adjusted may coexist with resonant frequency that need not be adjusted. Moreover, from the viewpoint of implementation, it is desired that any antenna apparatus to be implemented with a mobile terminal or a PC should have only one feeding point, i.e., common feeding point.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing an antenna apparatus according to a first embodiment;

FIG. 2 is a diagram showing an antenna apparatus according to a second embodiment;

FIG. 5 is a diagram showing an antenna apparatus according to a fifth embodiment;

FIG. 6 is a diagram showing an antenna apparatus according to a sixth embodiment;

FIG. 12A is a diagram showing an exemplary configuration of the frequency switching circuit incorporated in the antenna apparatus shown in FIG. 8;

FIG. 12B is a diagram showing another exemplary configuration of the frequency switching circuit incorporated in the antenna apparatus shown in FIG. 8;

FIG. 15 is a diagram showing still another exemplary configuration of the frequency switching circuit incorporated in the antenna apparatus shown in FIG. 8;

FIG. 16A is a graph showing the result of simulation performed for the VSWR of the antenna apparatus shown in FIG. 8, which incorporates the frequency switching circuit of FIG. 15;

FIG. 16B is a graph showing the result of simulation performed for the radiative efficiency of the antenna apparatus shown in FIG. 8, which incorporates the frequency switching circuit of FIG. 15;

FIG. 18 is a diagram explaining a simulation model of the antenna apparatus shown in FIG. 17;

FIG. 20A is a graph showing a result of simulation performed for the radiative efficiency of the antenna apparatus shown in FIG. 17;

FIG. 20B is a graph showing another result of simulation performed for the radiative efficiency of the antenna apparatus shown in FIG. 17;

FIG. 21 is a block diagram showing a communication apparatus using an antenna apparatus according to an embodiment;

DETAILED DESCRIPTION

Figure 3:
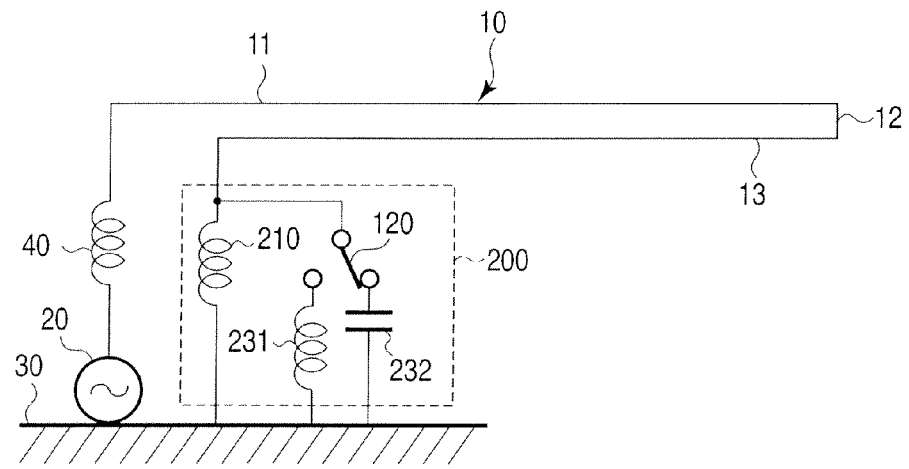
FIG. 3 is a diagram showing an antenna apparatus according to a third embodiment.

Various embodiments will be described hereinafter with reference to the accompanying drawings.

In general, according to one embodiment, an antenna apparatus comprises a first antenna element, a first lumped constant element, a switch and at least one second lumped constant element. The first antenna element comprises a forward part, a folded part and a backward part, the forward part comprising a start point connected to a feeding point, and the backward part comprising an end point connected to ground. The first lumped constant element is inserted in the backward part. The switch is configured to select a current path in accordance with a control signal. The at least one second lumped constant element is to be selectively connected in parallel to the first lumped constant element through the switch.

First Embodiment

As shown in FIG. 1, an antenna apparatus 1 according to a first embodiment has a first antenna element 10, a feeding point 20, a ground substrate (GND) 30, and a frequency switching circuit 100.

The first antenna element 10 is a so-called "folded monopole antenna." Hereinafter, of the antenna element 10, the part extending from the start point (connected to the feeding point 20) to the folded part 12 will be called "forward part 11," and the part extending from the folded part 12 to the end point (connected to the GND 30) will be called "backward part 13." The start point of the first antenna element 10 is connected to the feeding point, and the end point of the first antenna element 10 is connected to the GND 30. The frequency switching circuit 100 is inserted in the backward part 13. The resonant frequency of the first antenna element 10 can be adjusted by the frequency switching circuit 100.

The frequency switching circuit 100 includes a first lumped constant element 110 inserted in the backward part 13 of the first antenna element 10, a switch 120 connected in parallel to the first lumped constant element 110, a second lumped constant element 131 connected in series to the switch 120, and a second lumped constant element 132 also connected in series to the switch 120. The second lumped constant element 131 and the second lumped constant element 132 may be hereinafter referred to as "group of second lumped constant elements." The switch 120 is controlled by, for example, a control signal (not shown), to connect each second lumped constant element of the group to the first lumped constant element 110 in parallel. That is, the frequency switching circuit 100 corresponds to a module composed of the first lumped constant element 110 and one of the second lumped constant elements, which has been selected by the switch 120. The frequency switching circuit 100 can therefore adjust the resonant frequency of the first antenna element 10. In the frequency switching circuit 100, all elements do not need the switch 120 to be connected to the first antenna element 10. Rather, the first lumped constant element 110 is directly connected to the first antenna element 10. The high-frequency current flowing in the frequency switching circuit 100 can therefore be split into two currents, one flowing through the first lumped constant element 110, and the other flowing through the switch 120. Hence, in the frequency switching circuit 100, the current flowing through the switch 120 is smaller than in the case where all elements are connected by the switch. This can reduce the influence a loss at the active element (i.e., switch 120) may impose on the first antenna element 10.

As explained above, in the antenna apparatus according to this embodiment, the frequency switching circuit 100 is provided in the backward part 13 of the first antenna element 10 that is a folded monopole antenna. The frequency switching circuit 100 includes the first lumped constant element 110, the switch 120, and the group of second lumped constant elements that can be connected, by the switch 120, in parallel to the first lumped constant element 110. In The first lumped constant element 110 is thus directly connected to the first antenna element 10, not via an active element such as the switch 120, in the antenna apparatus according to this embodiment. The influence the active element imposes on the first antenna element 10 can be more reduced than in the case both the first lumped constant element 110 and the group of second lumped constant elements are connected by a switch.

Antenna apparatus according to any embodiments, including this embodiment, can be used in such a communication apparatus (e.g., mobile telephone or PC) as shown in FIG. 21. The communication apparatus transmits and receives a wireless signal. The communication apparatus of FIG. 21 has an antenna apparatus 300, a wireless module 301, a signal processor 302, a microphone 303, a speaker 304, a controller 305, a display controller 306, a display module 307, a storage module 308, an input module 309, an interface 310, and a removable medium 311.

The antenna apparatus 300 corresponds to the antenna apparatus according to this embodiment. The antenna apparatus 300 can receive a control signal input from, for example, the controller 305 and can switch the state of the frequency switching circuit incorporated in it, to adjust at least one resonant frequency. If the antenna apparatus 300 shown in FIG. 21 is the antenna apparatus according to any embodiments including the present embodiment, it can attain the advantages of any embodiments including the present embodiment.

The wireless module 301 operates in accordance with the instruction coming from the controller 305. It up-converts a transmission signal output from the signal processor 302 to a wireless frequency, transmits the signal via the antenna apparatus 300 to a base station provided on a mobile communication network (not shown), receives a wireless signal via the antenna apparatus 300 from the base station, and down-converts the wireless signal to a baseband signal.

The signal processor 302 also operates in accordance with the instruction coming from the controller 305. It converts a voice signal input from the microphone 303 to transmission data, generates the transmission signal from the transmission data, demodulates the baseband signal input from the wireless module 301, generating reception data, decode the reception data, generating a voice signal, and outputs the voice signal to the speaker 304, which generates sound from the voice signal. The controller 305 comprises a processor such as CPU, and controls each component of the communication apparatus of FIG. 21.

The storage module 308 is a storage medium such as a random access memory (RAM), a read-only memory (ROM) or a hard disk drive, and stores programs or control data for the controller 305, various data items the user has generated, and control data pertaining to the removable medium 311. In accordance with the instruction coming from the controller 305, the display controller 306 drives and controls the display module 307, causing the display module 307 to display the image represented by the display data supplied from the controller 305. The input module 309 includes a user interface designed to receive the user's request input at an input device such as a plurality of key switches (e.g., so-called numeric keypad) or a touch panel. The interface (I/F) 310 is an interface physically or electrically connected to the removable medium 311 and designed to exchange data with the removable medium 311, and is controlled by the controller 305.

Second Embodiment

FIG. 2 shows an antenna apparatus according to a second embodiment. This antenna apparatus differs from the antenna apparatus of FIG. 1, in that a frequency switching circuit 200 is used in place of the frequency switching circuit 100 shown in FIG. 1. In the following explanation, the components identical to those shown in FIG. 1 are designated by the same reference numbers in FIG. 2, and the different components will be described in the main.

The frequency switching circuit 200 includes an inductor 210 directly connected to the backward part 13 of the first antenna element 10, and an inductor 231 and a capacitor 232, both can be connected in parallel by a switch 120 to the inductor 210. That is, in the frequency switching circuit 200, the inductor 210 is used as a component corresponding to the first lumped constant element 110 of the above-mentioned frequency switching circuit 100, and the inductor 231 and capacitor 232 are used as components corresponding to the group of second lumped constant elements of the above-mentioned frequency switching circuit 100. To make the resonant frequency higher than the resonant frequency defined by the inductor 210 and the first antenna element 10, the switch 120 selects the inductor 231. To render the resonant frequency lower than the resonant frequency defined by the inductor 210 and the first antenna element 10, the switch 120 selects the capacitor 232. Note that the lumped constant elements used in the frequency switching circuit 200 may be changed, as needed, in accordance with the frequency characteristic the antenna apparatus needs to have.

The technical significance of using the inductor 210 as first lumped constant element will be explained below.

Figure 13A:
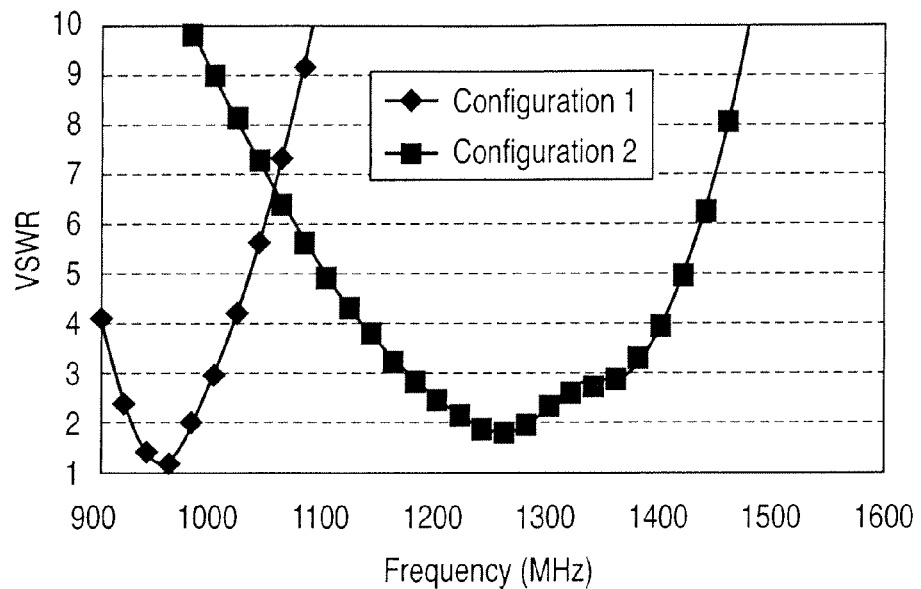
FIG. 13A is a graph showing the result of simulation performed for the VSWR of two antenna apparatuses which have the configurations of FIGS. 12A and 12B, respectively.
Figure 13B:
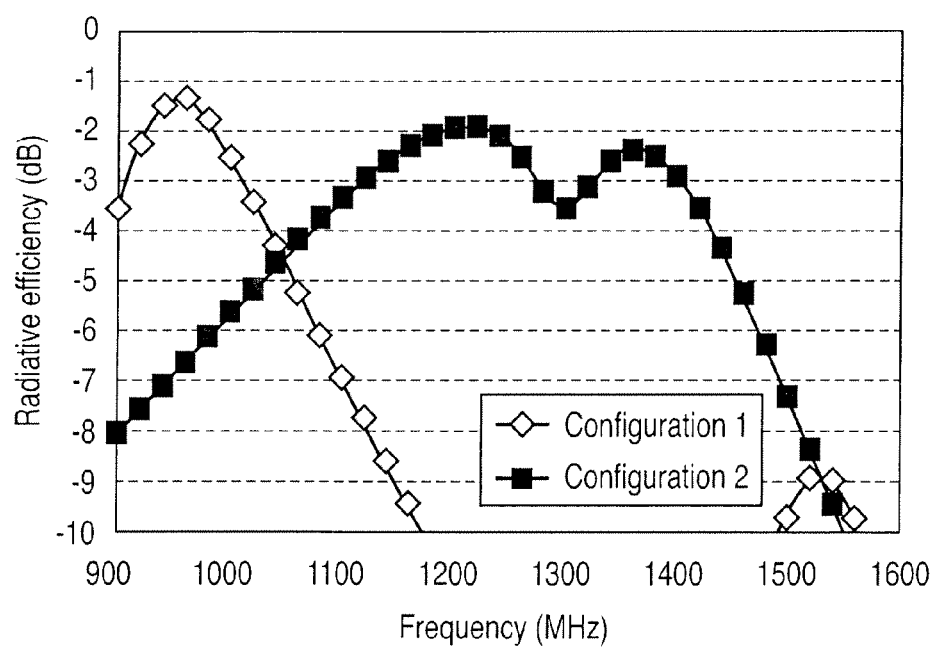
FIG. 13B is a graph showing the result of simulation performed for the radiative efficiency of the two antenna apparatuses which have the configurations of FIGS. 12A and 12B, respectively.

Generally, the smaller an antenna apparatus, the more difficult it will be to lower the resonant frequency. It is therefore desired that the frequency switching circuit 200 should set such a low resonant frequency that the antenna apparatus according to this embodiment may be made small. It will be discussed how much the frequency characteristic the antenna element 10 has if an inductor is used as first lumped constant element differs from the frequency characteristic the antenna element 10 has if a capacitor is used as first lumped constant element. More precisely, the configuration (hereinafter referred to as "Configuration 1") of a frequency switching circuit shown FIG. 12A will be compared with the configuration (hereinafter referred to as "Configuration 2") of a frequency switching circuit shown FIG. 12B. Configuration 1 uses an inductor (7.2 nH) as first lumped constant element. Configuration 2 uses a capacitor (1.2 pF) as first lumped constant element. Configuration 1 uses a capacitor (1.2 pF) as second lumped constant element, whereas Configuration 2 uses an inductor (7.2 nH) as second lumped constant element. Thus, both Configuration 1 and Configuration 2 correspond to a parallel connection of an inductor (7.2 nH) and a capacitor (1.2 pF), if the switch is not taken into account. FIG. 13A shows the result of simulation performed for the VSWR of two antenna apparatuses which have Configurations 1 and 2, respectively. FIG. 13B shows the result of simulation performed for the radiative efficiency of the two antenna apparatuses which have Configurations 1 and 2, respectively. The conditions in which the simulation was performed to provide the results shown in FIG. 13A and FIG. 13B will be described later, with reference to FIG. 8 and FIG. 9. As seen from FIG. 13A and FIG. 13B, Configuration 1 has lower resonant frequency than Configuration 2. Hence, if a capacitor and a inductor that have the same parameter are used as first and second lumped constant elements, respectively, Configuration 1 wherein the inductor is used as first lumped constant element can be said to set a lower resonant frequency than Configuration 2 wherein the capacitor is used as first lumped constant element.

What type of lumped constant elements should be connected as the group of second lumped constant elements will be discussed below.

First, assume that the frequency switching circuit has such a configuration as shown in FIG. 15. In this frequency switching circuit, the first lumped constant element is an inductor L2 (7.2 nH), the second lumped constant element is a capacitor C1 (1.2 pF), and a variable element V1 is provided. FIG. 16A shows the result of simulation performed for the VSWR of the antenna apparatus in which the switch selects a variable element V1, the parameters of which were changed to 1.2 nH, 4.2 nH and 7.2 nH and to 0.2 pF, 1.2 pF and 2.2 pF. FIG. 16B shows the result of simulation performed for the radiative efficiency of this antenna apparatus. The conditions of the simulation pertaining to FIG. 16A and FIG. 16B will be described later, in conjunction with FIG. 8 and FIG. 9. As evident from FIG. 16A and FIG. 16B, if an inductor is connected as second lumped constant element, the resonant frequency will be higher and the change in resonant frequency due to the change of the parameter (inductance) will be smaller than in the case where a capacitor is connected as second constant element. On the other hand, if a capacitor is connected as second lumped constant element, the resonant frequency will be lower, and the change in resonant frequency due to the change of the parameter (capacitance) will be smaller than in the case where an inductor is connected as second lumped constant element.

As has been described, in accordance with a desired frequency characteristic, a specific element is selected and used as the first lumped constant element or the group of second lumped constant elements in the antenna apparatus according to this embodiment. The resonant frequency can therefore be relatively low in the antenna apparatus if an inductor is used as, for example, the first lumped constant element.

Third Embodiment

FIG. 3 shows an antenna apparatus according to a third embodiment. This antenna apparatus differs from the antenna apparatus of FIG. 2, in that an inductor 40 is directly inserted in the forward part 11 of the first antenna element 10. In the following explanation, the components identical to those shown in FIG. 2 are designated by the same reference numbers in FIG. 3, and the different components will be described in the main. Note that as in the antenna apparatus of this embodiment, an inductor 40 may be directly inserted in the forward part 11 of the first antenna element 10 in the antenna apparatus according to any other embodiment.

The inductor 40 (i.e., third lumped constant element) has almost the same electrical length (i.e., inductance) as the element (i.e., inductor 210) directly inserted in the backward part 13 of the first antenna element 10.

As indicated above, the inductor 40 is directly inserted in the forward part 11 of the first antenna element 10 in the antenna apparatus according to this embodiment, so that the forward part 11 and backward part 13 of the first antenna element 10 may have almost the same electrical length. Therefore, the impedance of the antenna increases because the first antenna element 10 operates in folded mode in the antenna apparatus according to this embodiment. Hence, the he antenna apparatus is not easily influenced by the impedance drop resulting from any close metal member such as GND 30.

Fourth Embodiment

Figure 4:
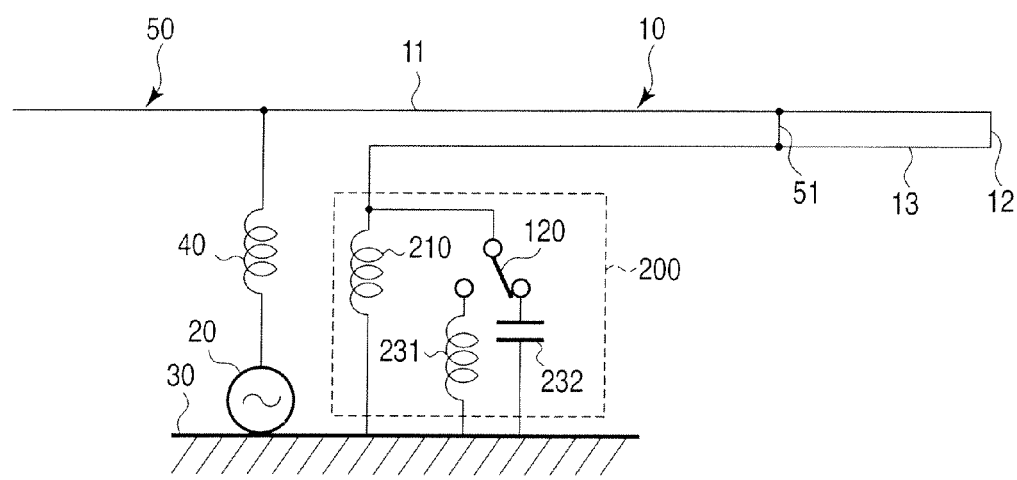
FIG. 4 is a diagram showing an antenna apparatus according to a fourth embodiment.

FIG. 4 shows an antenna apparatus according to a fourth embodiment. This antenna apparatus differs from the antenna apparatus of FIG. 3, in that a second antenna element 50 and a stub 51 are used in addition. In the following explanation, the components identical to those shown in FIG. 3 are designated by the same reference numbers in FIG. 4, and the different components will be described in the main. Note that as in the antenna apparatus of this embodiment, a second antenna element 50 and a stub 51 may be used in the antenna apparatus according to any other embodiment.

The second antenna element 50 is a monopole antenna, sharing the feeding point 20 and a part of the forward part 11, with the first antenna element 10. The second antenna element 50 branches from the forward part 11 of the first antenna element 10. The stub 51 short-circuits the forward part 11 of the first antenna element 10 to the backward part 13 thereof. The electrical length, measured from the start point of the first antenna element 10 to the end point thereof, via the forward part 11, stub 51 and backward part 13, is preferably half (½) the wavelength corresponding to the resonant frequency of the second antenna element 50. The use of the stub 51 can reduce the influence the frequency switching circuit 200 may impose on the resonant frequency of the second antenna element 50. That is, the resonant frequency of the second antenna element 50 will not easily change even if the resonant frequency of the first antenna element 10 is switched.

The frequency characteristic of the antenna apparatus according to this embodiment will be considered on the basis of simulation. More specifically, it will be verified that the frequency switching circuit 200 can switch the resonant frequency of the first antenna element 10 and not easily influences the resonant frequency of the second antenna element 50.

Figure 8:
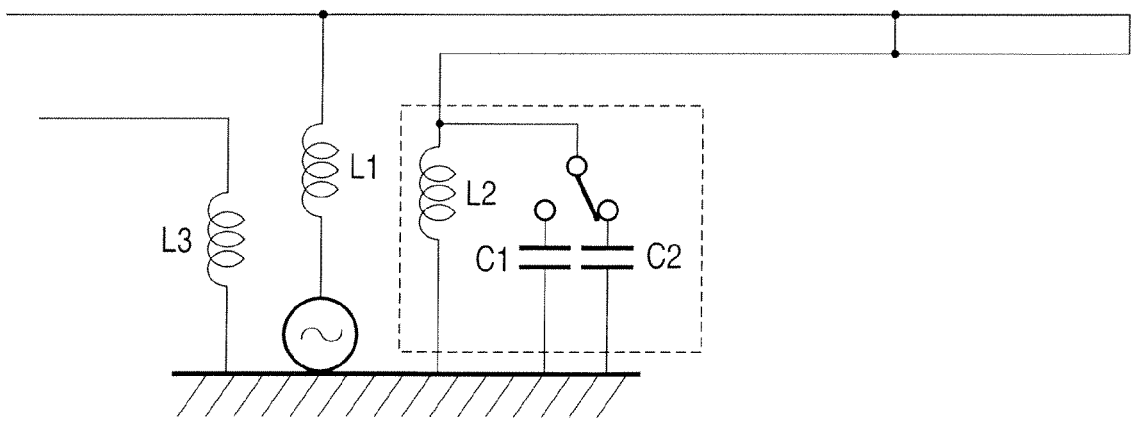
FIG. 8 is a diagram showing an antenna apparatus according to an embodiment.
Figure 9:
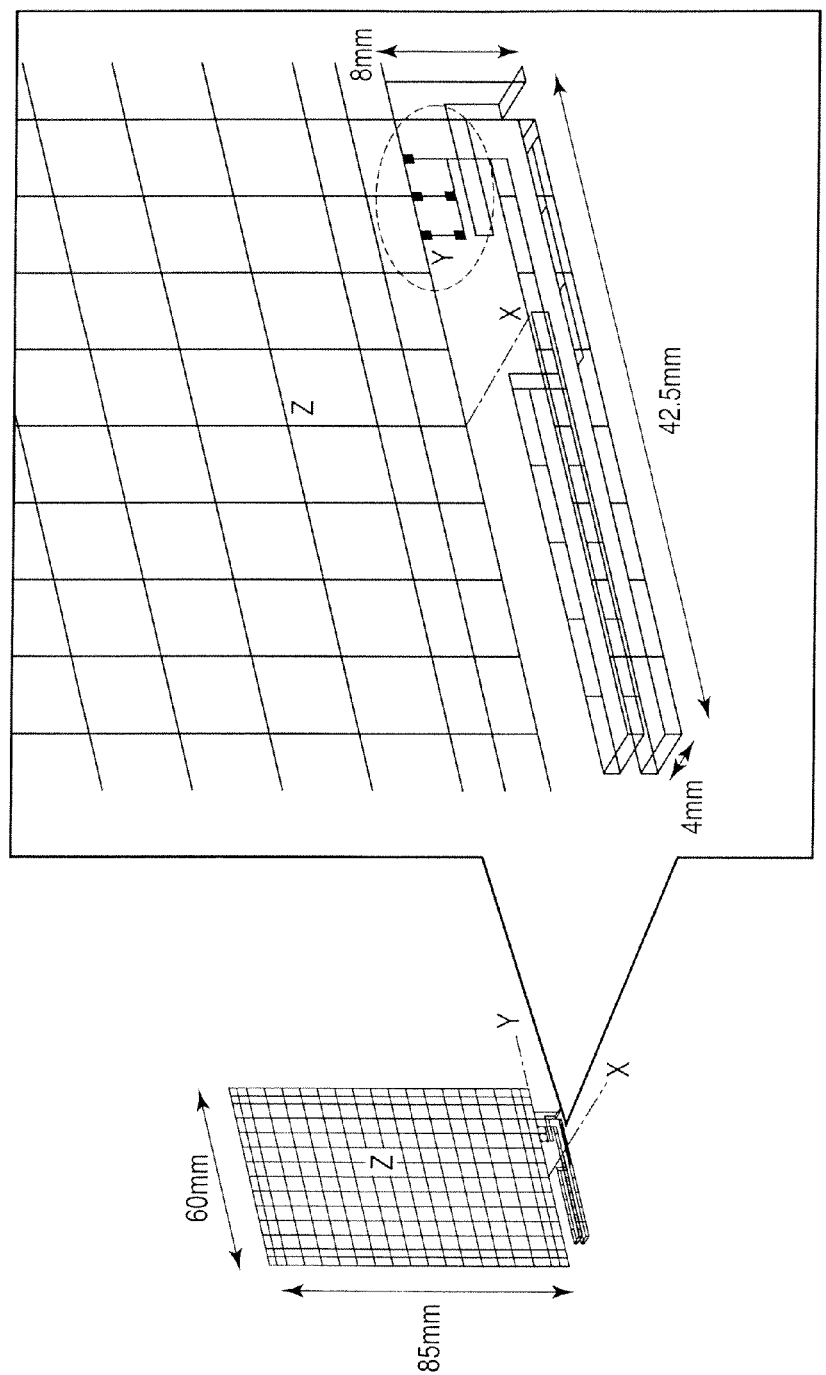
FIG. 9 is a diagram explaining a simulation model of the antenna apparatus shown in FIG. 8.

The simulation is performed on the antenna apparatus shown in FIG. 8. In the simulation, the moment method (4NEC2) is employed. The antenna apparatus of FIG. 8 has an antenna element without feeding. This antenna element will be explained later, in conjunction with a sixth embodiment. The parameters pertaining to the antenna apparatus of FIG. 8 are as follows. Inductor L1 has an inductance of 7.2 nH, inductor L2 has an inductance of 7.2 nH, and inductor L3 has an inductance of zero. Capacitor C1 has a capacitance of 1.2 pF, and capacitor C2 has a capacitance of 0.5 pF. The switch is expressed as an equivalent circuit model of a MESFET switch. To be more specific, the switch has insertion loss of 0.25 dB, the isolation is assumed to be about 32 dB. Then, in a 50Ω system, the switch corresponds to a resistor of 3Ω in an on state, and corresponds to a parallel circuit of a resistor of 3500Ω and a capacitor of 0.5 pF. The antenna apparatus of FIG. 8 is presented as the simulation model of FIG. 9. FIG. 9 specifies the dimensions of an antenna element and those of a ground substrate. In FIG. 9, the part indicated by the broken circle is the frequency switching circuit. Hereinafter, for the apparatus of FIG. 8, the state when the switch selects the capacitor C1 will be called State 1, and the state when the switch selects the capacitor C2 will be called State 2.

Figure 10A:
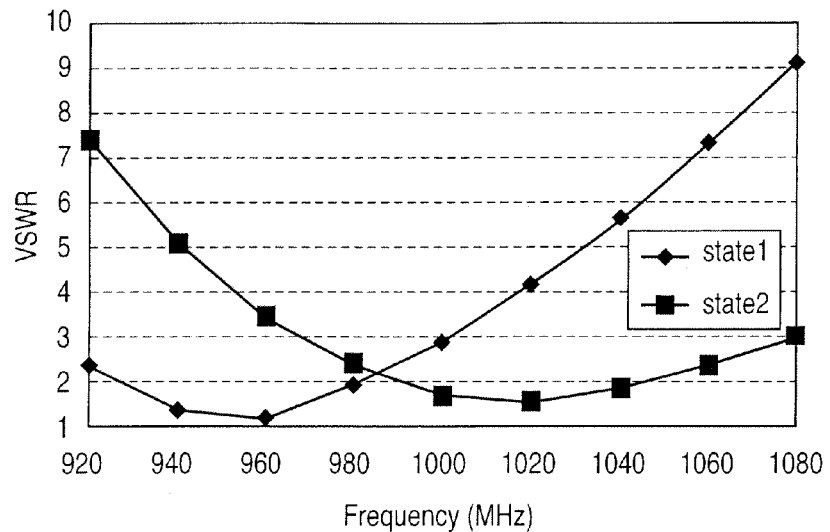
FIG. 10A is a graph showing a result of simulation performed for the voltage standing wave ratio (VSWR) of the antenna apparatus shown in FIG. 8.
Figure 10B:
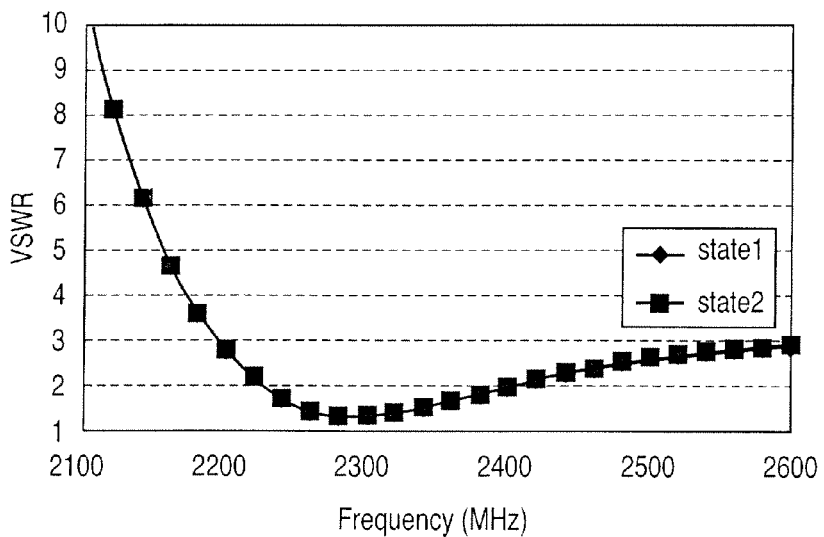
FIG. 10B is a graph showing another result of simulation performed for the VSWR of the antenna apparatus shown in FIG. 8.
Figure 11A:
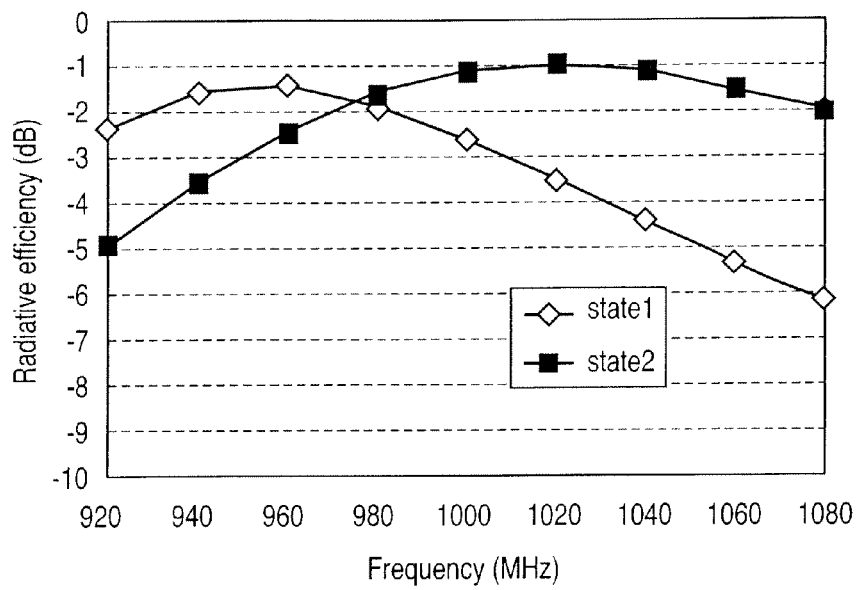
FIG. 11A is a graph showing a result of simulation performed for the radiative efficiency of the antenna apparatus shown in FIG. 8.
Figure 11B:
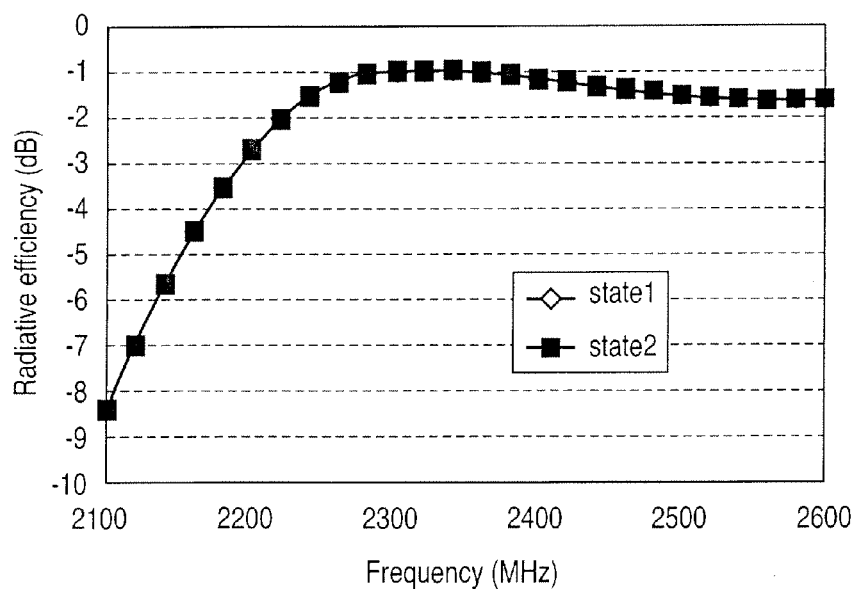
FIG. 11B is a graph showing another result of simulation performed for the radiative efficiency of the antenna apparatus shown in FIG. 8.

FIG. 10A shows the VSWR the antenna apparatus of FIG. 8 has at a frequency close to the resonant frequency of the first antenna element. FIG. 11A shows the radiative characteristic the antenna apparatus of FIG. 8 has at a frequency close to the resonant frequency of the first antenna element. As evident from FIG. 10A and FIG. 11A, the resonant frequency of the first antenna element changes in accordance with the state of the frequency switching circuit. FIG. 10B shows the VSWR the antenna apparatus of FIG. 8 has at a frequency close to the resonant frequency of the second antenna element. FIG. 11B shows the radiative characteristic the antenna apparatus of FIG. 8 has the frequency close to the resonant frequency of the second antenna element. As seen from FIG. 10B and FIG. 11B, the resonant frequency of the second antenna element is constant, irrespective of the state the frequency switching circuit.

Figure 22A:
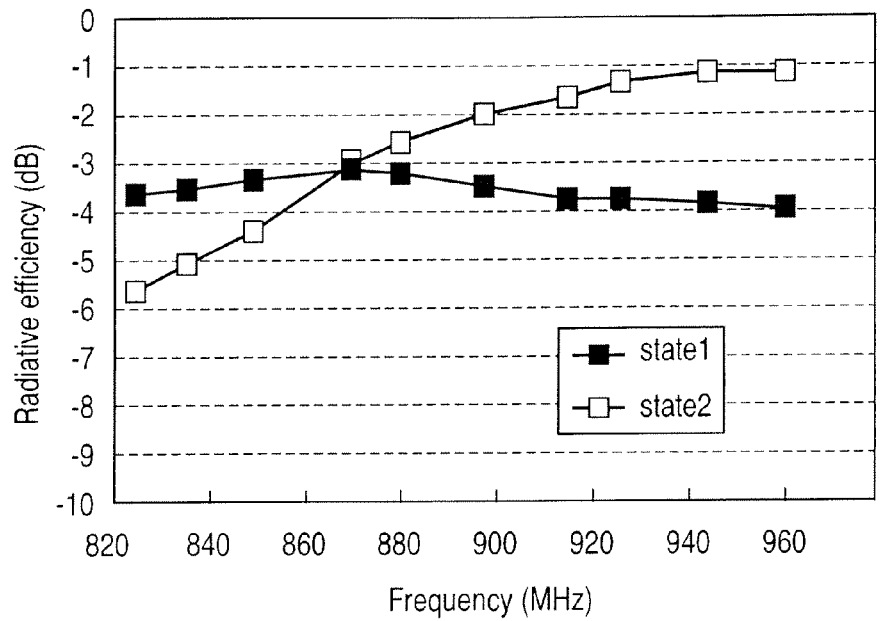
FIG. 22A is a graph showing a result of an experiment performed for the radiative efficiency of the antenna apparatus shown in FIG. 8.
Figure 22B:
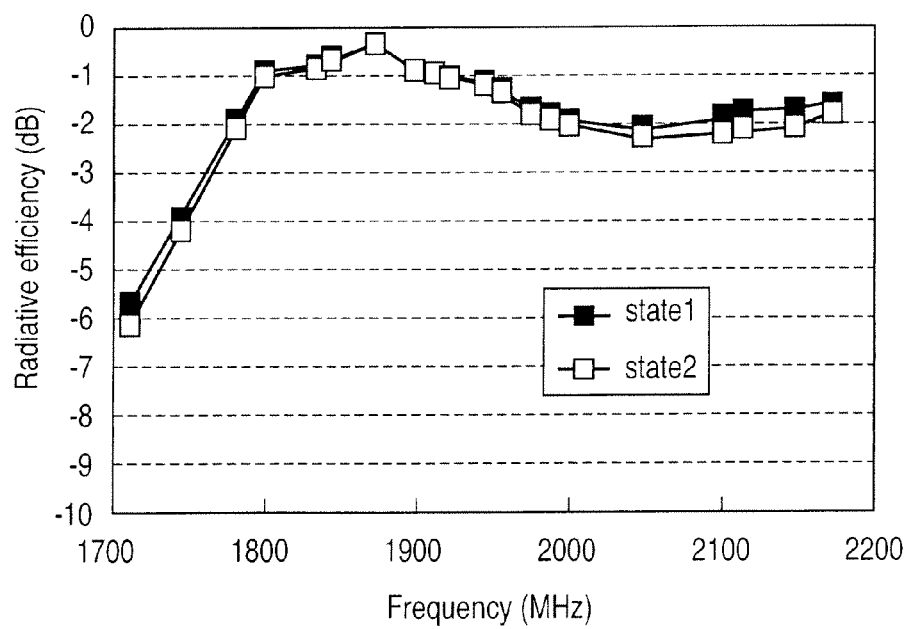
FIG. 22B is a graph showing another result of an experiment performed for the radiative efficiency of the antenna apparatus shown in FIG. 8.

The antenna apparatus of FIG. 8 was implemented, and tested for its radiative characteristic. The antenna apparatus was found to have acquired a radiative characteristic similar to the simulation result shown in FIG. 11A and FIG. 11B. FIG. 22A shows the radiative characteristic the antenna apparatus has at a frequency close to the resonant frequency of the first antenna element. As clear from FIG. 22A, the resonant frequency of the first antenna element changes in accordance with the state of the frequency switching circuit. On the other hand, FIG. 22B shows the radiative characteristic the antenna apparatus exhibits at a frequency close to the resonant frequency of the second antenna element. As evident form FIG. 22B, the resonant frequency of the second antenna element is constant, irrespective of the state the frequency switching circuit assumes. The resonant frequency shown in FIG. 22A and FIG. 22B is lower than the resonant frequency shown in FIG. 11A and FIG. 11B. This may be attributed to the dielectric that is used in implementation of the antenna apparatus.

Figure 14A:
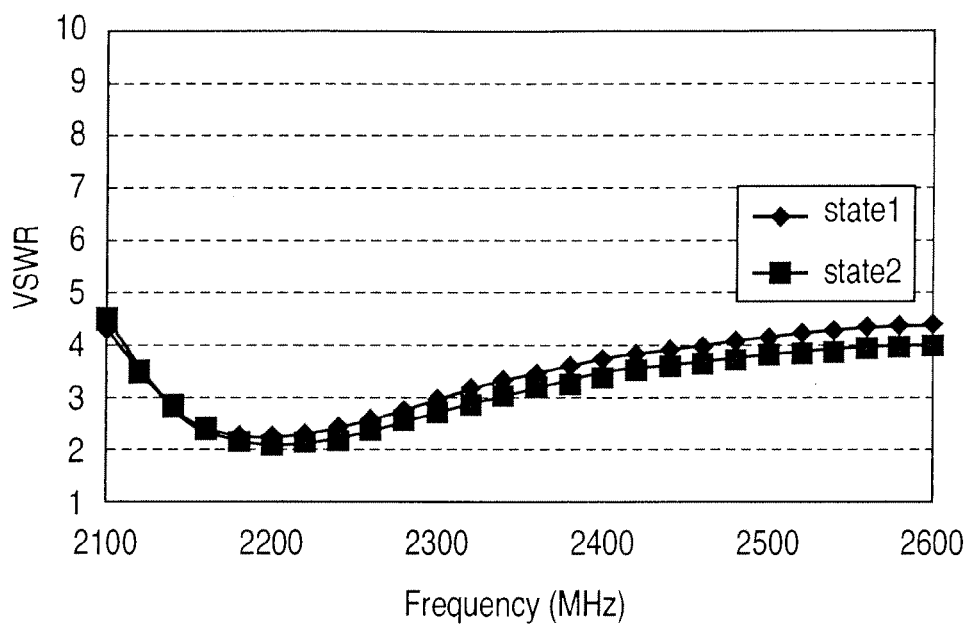
FIG. 14A is a graph showing the result of simulation performed for the VSWR of the antenna apparatus shown in FIG. 8, in which the stub position is changed.
Figure 14B:
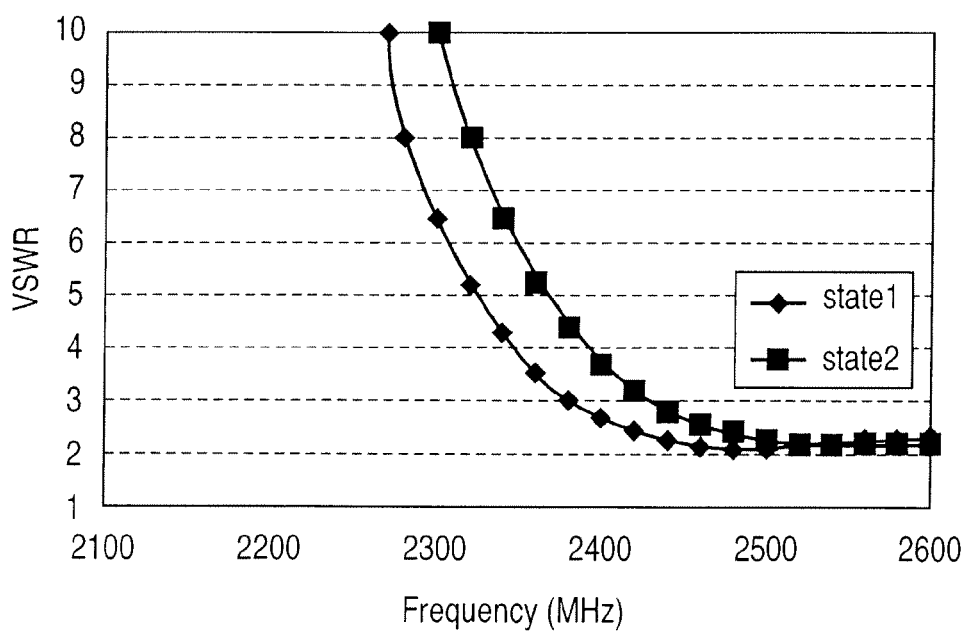
FIG. 14B is a graph showing the result of simulation performed for the VSWR of the antenna apparatus shown in FIG. 8, in which the stub position is changed.

As pointed out above, it is desired that a stub be provided so that the electrical length, measured from the start point of the first antenna element 10 to the end point thereof, via the forward part 11, stub 51 and backward part 13, may be half (½) the wavelength corresponding to the resonant frequency of the second antenna element. If the stub is offset from this position, the resonant frequency of the second antenna element will influence the frequency switching circuit. FIG. 14A shows the VSWR the antenna apparatus shown in FIG. 8 will have (at a frequency close to the resonant frequency the second antenna element) if the stub is offset by −10 mm (that is, moved 10 mm away from the folded part). FIG. 14B shows the VSWR the antenna apparatus shown in FIG. 8 will have (at a frequency close to the resonant frequency the second antenna element) if the stub is offset by +5 mm (that is, moved 5 mm toward the folded part). As clearly seen from FIG. 14A and FIG. 14B, the second antenna element may be influenced by the frequency switching circuit, depending on the position of the stub. Hence, the stub should be carefully positioned.

As explained above, the antenna apparatus according to this embodiment has a second antenna element branching from the forward part of the first antenna element, and a stub short-circuiting the forward and backward parts of the first antenna element. The antenna apparatus according to this embodiment can therefore acquire a resonant mode that is not influenced by the frequency switching circuit.

Fifth Embodiment

FIG. 5 shows an antenna apparatus according to a fifth embodiment. This antenna apparatus differs from the antenna apparatus of FIG. 4, in that it has an additional antenna element, i.e., third antenna element 60. In the following explanation, the components identical to those shown in FIG. 4 are designated by the same reference numbers in FIG. 5, and the different components will be described in the main. Note that as in this embodiment, the third antenna element 60 may be used, as additional component, in the antenna apparatus according to any other embodiment.

The third antenna element 60 branches from the backward part 13 of the first antenna element 10 and includes a contact with the switch 120. The resonant frequency of the third antenna element 60 changes in accordance with the state of the frequency switching circuit 200.

The frequency characteristic of the antenna apparatus according to this embodiment will be considered on the basis of simulation results. More precisely, the frequency characteristic will be verified that the frequency switching circuit 200 can switch not only the resonant frequency of the first antenna element 10, but also the resonant frequency of the third antenna element 60.

Figure 17:
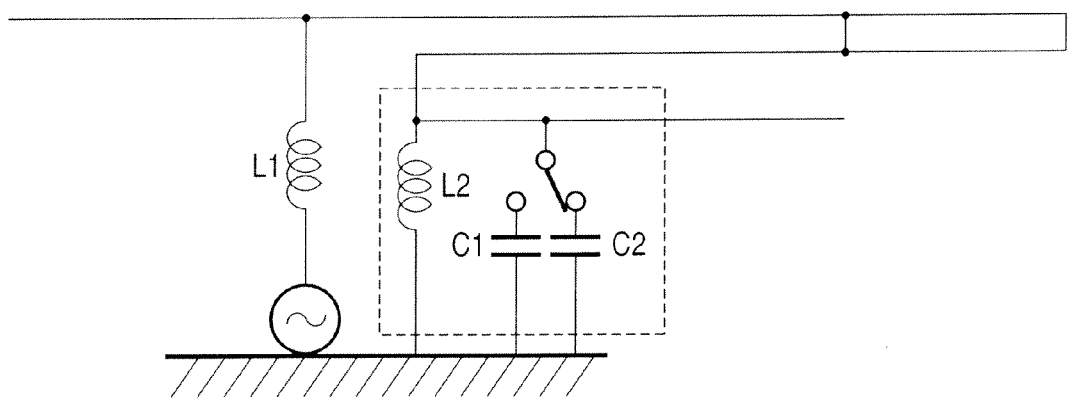
FIG. 17 is a diagram showing an antenna apparatus according to an embodiment.

FIG. 17 shows an antenna apparatus, which is subjected to the simulation. The simulation is performed by employing the moment method (4NEC2). The parameters pertaining to the antenna apparatus of FIG. 17 are as follows. Inductor L1 has an inductance of 7.2 nH, and inductor L2 has an inductance of 7.2 nH. Capacitor C1 has a capacitance of 0.2 pF, and capacitor C2 has a capacitance of 0.5 pF. The switch is expressed as an equivalent circuit model of a MESFET switch. More specifically, the switch has insertion loss of 0.25 dB, the isolation is assumed to be about 32 dB. Then, in a 50Ω system, the switch corresponds to a resistor of 3Ω in an on state, and corresponds to a parallel circuit of a resistor of 3500Ω and a capacitor of 0.5 pF. The antenna apparatus of FIG. 17 is presented as the simulation model of FIG. 18. FIG. 18 specifies the dimensions of an antenna element and those of a ground substrate. In FIG. 18, the part indicated by the broken circle is the frequency switching circuit. Hereinafter, for the antenna apparatus of FIG. 17, the state when the switch selects the capacitor C1 will be called State 1, and the state when the switch selects the capacitor C2 will be called State 2.

Figure 19A:
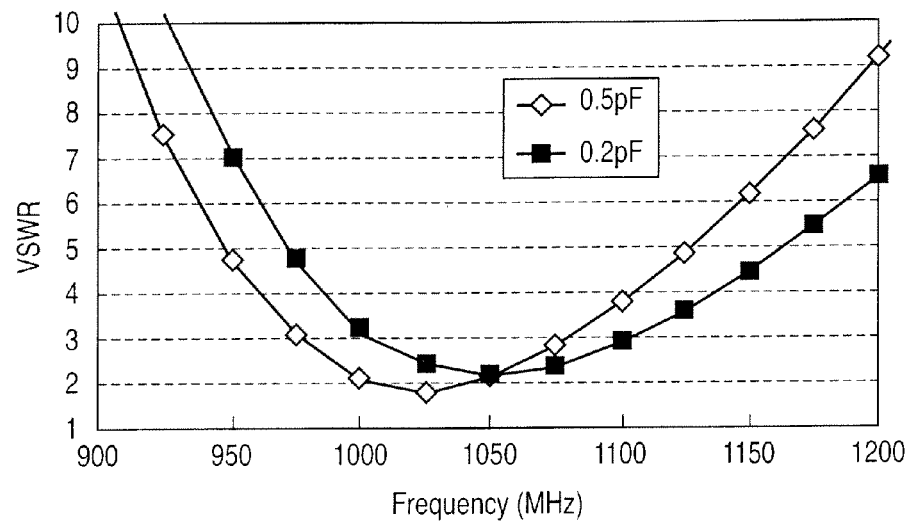
FIG. 19A is a graph showing a result of simulation performed for the VSWR of the antenna apparatus shown in FIG. 17.
Figure 19B:
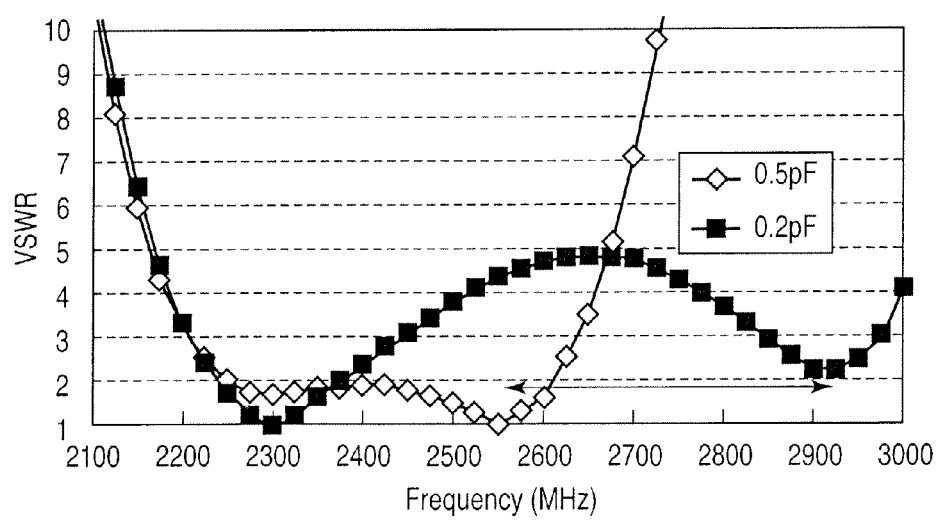
FIG. 19B is a graph showing another result of simulation performed for the VSWR of the antenna apparatus shown in FIG. 17.

FIG. 19A shows the VSWR the antenna apparatus of FIG. 17 has at a frequency close to the resonant frequency of the first antenna element. FIG. 20A shows the radiative characteristic the antenna apparatus of FIG. 17 has at a frequency close to the resonant frequency of the first antenna element. As evident from FIG. 19A and FIG. 20A, the resonant frequency of the first antenna element changes in accordance with the state of the frequency switching circuit. FIG. 19B shows the VSWR the antenna apparatus of FIG. 17 has at a frequency close to the resonant frequency of the third antenna element. FIG. 20B shows the radiative characteristic the antenna apparatus of FIG. 17 has the frequency close to the resonant frequency of the third antenna element. As seen from FIG. 19B and FIG. 20B, the resonant frequency of the third antenna element also changes in accordance with the state of the frequency switching circuit.

As explained above, the antenna apparatus according to this embodiment has a third antenna element branching from the backward part of the first antenna element and including a contact with the switch. Therefore, the antenna apparatus according to this embodiment can acquire a resonant mode in which the resonant frequency changes in accordance with the state of the frequency switching circuit.

Sixth Embodiment

FIG. 6 shows an antenna apparatus according to a sixth embodiment. This antenna apparatus differs from the antenna apparatus of FIG. 5, in that it has two additional components, i.e., a fourth antenna element 70 and an inductor 71. In the following explanation, the components identical to those shown in FIG. 5 are designated by the same reference numbers in FIG. 6, and the different components will be described in the main. Note that as in this embodiment, the fourth antenna element 70 and the inductor 71 may be used, as additional components, in the antenna apparatus according to any other embodiment.

The fourth antenna element 70 is an antenna element without feeding. The fourth antenna element 70 is connected to the GND 30, at a position near the feeding point 20. The fourth antenna element 70 is not influenced by the frequency switching circuit 200.

As described above, the antenna apparatus according to this embodiment has a fourth antenna element without feeding. Hence, the antenna apparatus according to this embodiment can acquire a resonant mode in which the resonant frequency is not influenced by the state of the frequency switching circuit.

Seventh Embodiment

Figure 7:
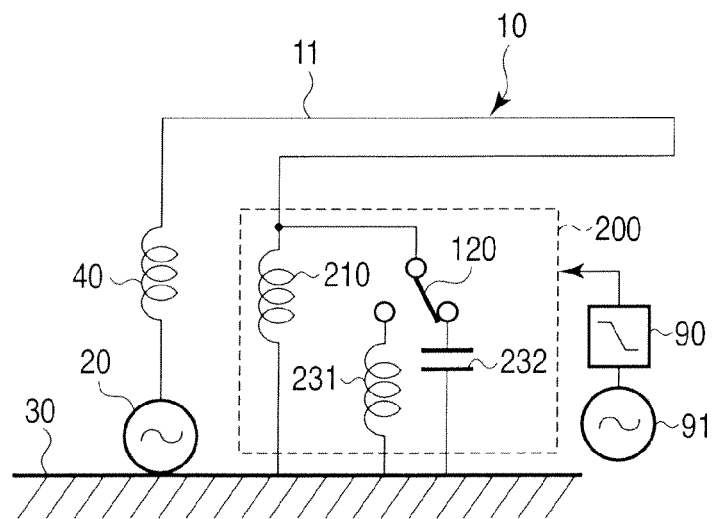
FIG. 7 is a diagram showing an antenna apparatus according to a seventh embodiment.

FIG. 7 shows an antenna apparatus according to a seventh embodiment. This antenna apparatus differs from the antenna apparatus of FIG. 3, in that a control signal source 90 and a low-pass filter 91 are used in addition. In the following explanation, the components identical to those shown in FIG. 3 are designated by the same reference numbers in FIG. 7, and the different components will be described in the main. Note that as in the antenna apparatus of this embodiment, a control signal source 90 and a low-pass filter 91 may be used, as additional components, in the antenna apparatus according to any other embodiment.

The control signal source 90 generates a control signal, which is supplied to the switch 120. The low-pass filter 91 performs a filtering process on the control signal coming from the control signal source 90, suppressing the high-frequency component of the control signal, and therefore supplies the low-frequency component of the control signal to the switch 120. If one line serves as both the control signal line and the feeding line, the low-pass filter 91 will perform the same or similar filtering process on the feeding signal, too. It is desired that the cutoff frequency of the low-pass filter 91 should be lower than all operating frequencies supported in the antenna apparatus according to this embodiment.

As described above, the control signal supplied to the switch 120 undergoes a low-pass filtering process. Hence, the high-frequency current dose not couples with the control signal line, and therefore the antenna characteristic will not be degraded in the antenna apparatus according to this embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna apparatus comprising:
an antenna element connected to a feeding point;
a first lumped constant element;
a second lumped constant element;
a third lumped constant element; and
a selector,
wherein
the first lumped constant element comprises a first end and a second end, the first end connected to the antenna element, and the second end grounded,
the second lumped constant element and the third lumped constant element are grounded,
the second lumped constant element and the third lumped constant element are selectively connected to the antenna element through the selector,
a resonant frequency of the antenna element is lowered when the second lumped constant element is connected to the antenna element, and
a resonant frequency of the antenna element is raised when the third lumped constant element is connected to the antenna element.

2. The apparatus of claim 1, wherein the grounded first lumped constant element and one of the second lumped constant element and the third lumped constant element are electrically connected in parallel.

3. The apparatus of claim 2, wherein the second lumped constant element comprises a first inductor.

4. The apparatus of claim 3, wherein the third lumped constant element comprises a second inductor.

5. The apparatus of claim 3, wherein the third lumped constant element comprises a capacitor.

6. The apparatus of claim 1, wherein the first lumped constant element comprises a first inductor, the second lumped constant element and the third lumped constant element comprise a second inductor and a capacitor, one of which is selectively connected in parallel to the first inductor through the selector; and a resonant frequency of the antenna element is lowered when the capacitor is connected in parallel to the first inductor, and a resonant frequency of the antenna element is raised when the second inductor is connected in parallel to the first inductor.

7. The apparatus of claim 2, wherein the second lumped constant element comprises a first capacitor.

8. The apparatus of claim 7, wherein the third lumped constant element comprises a second capacitor.

9. The apparatus of claim 1, wherein
the selector switches a first electrical path and a second electrical path,
the second lumped element is connected to the antenna element through the selector in the first electrical path,
the third lumped element is connected to the antenna element through the selector in the second electrical path.

10. A communication apparatus comprising:
an antenna apparatus comprising an antenna element connected to a feeding point, a first lumped constant element, a second lumped constant element, a third lumped constant element and a selector;
a wireless module configured to up-convert a baseband transmission signal to a wireless transmission signal to be transmitted from the antenna apparatus, and to down-convert a wireless reception signal received by the antenna apparatus to a baseband reception signal; and
a signal processor configured to process the baseband transmission signal and the baseband reception signal,
wherein
the first lumped constant element comprises a first end and a second end, the first end connected to the antenna element, and the second end grounded,
the second lumped constant element and the third lumped constant element are grounded,
the second lumped constant element and the third lumped constant element are selectively connected to the antenna element through the selector,
a resonant frequency of the antenna element is lowered when the second lumped constant element is connected to the antenna element, and
a resonant frequency of the antenna element is raised when the third lumped constant element is connected to the antenna element.

11. The communication apparatus of claim 10, wherein the first lumped constant element and one of the second lumped constant element and the third lumped constant element are electrically connected in parallel.

12. The communication apparatus of claim 11, wherein the second lumped constant element comprises a first inductor.

13. The communication apparatus of claim 12, wherein the third lumped constant element comprises a second inductor.

14. The communication apparatus of claim 12, wherein the third lumped constant element comprises a capacitor.

15. The communication apparatus of claim 10, wherein the first lumped constant element comprises a first inductor, the second lumped constant element and the third lumped constant element comprise a second inductor and a capacitor, one of which is selectively connected in parallel to the first inductor through the selector; and a resonant frequency of the antenna element is lowered when the capacitor is connected in parallel to the first inductor, and a resonant frequency of the antenna element is raised when the second inductor is connected in parallel to the first inductor.

16. The communication apparatus of claim 11, wherein the second lumped constant element comprises a first capacitor.

17. The communication apparatus of claim 16, wherein the third lumped constant element comprises a second capacitor.

18. The communication apparatus of claim 10, wherein
the selector switches a first electrical path and a second electrical path,
the second lumped element is connected to the antenna element through the selector in the first electrical path,
the third lumped element is connected to the antenna element through the selector in the second electrical path.

19. An antenna apparatus comprising:
an antenna element connected to a feeding point;
a first element;
a second element;
a third element; and
a selector,
wherein
the first element comprises a first end and a second end, the first end connected to the antenna element, and the second end grounded,
the second element and the third element are grounded,
the second element and the third element are selectively connected to the antenna element through the selector,
a resonant frequency of the antenna element is lowered when the second element is connected to the antenna element, and
a resonant frequency of the antenna element is raised when the third element is connected to the antenna element.

20. The apparatus of claim 19, wherein the first element and one of the second element and the third element are electrically connected in parallel.

21. The apparatus of claim 20, wherein the second element comprises an inductor.

22. The apparatus of claim 21, wherein the third element comprises one of an inductor and a capacitor.

23. The communication apparatus of claim 19, wherein
the selector switches a first electrical path and a second electrical path,
the second lumped element is connected to the antenna element through the selector in the first electrical path,
the third lumped element is connected to the antenna element through the selector in the second electrical path.

* * * * *